United States Patent Office 3,040,884
Patented June 26, 1962

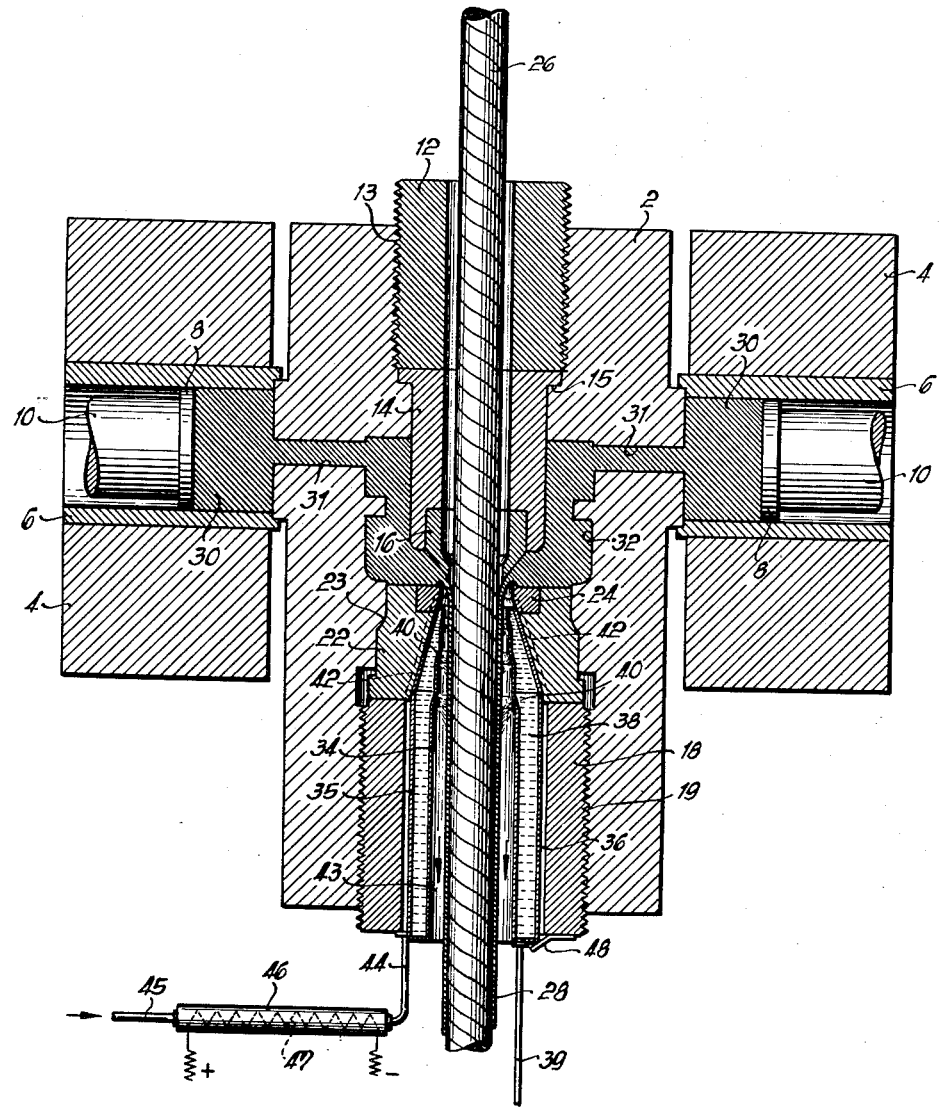

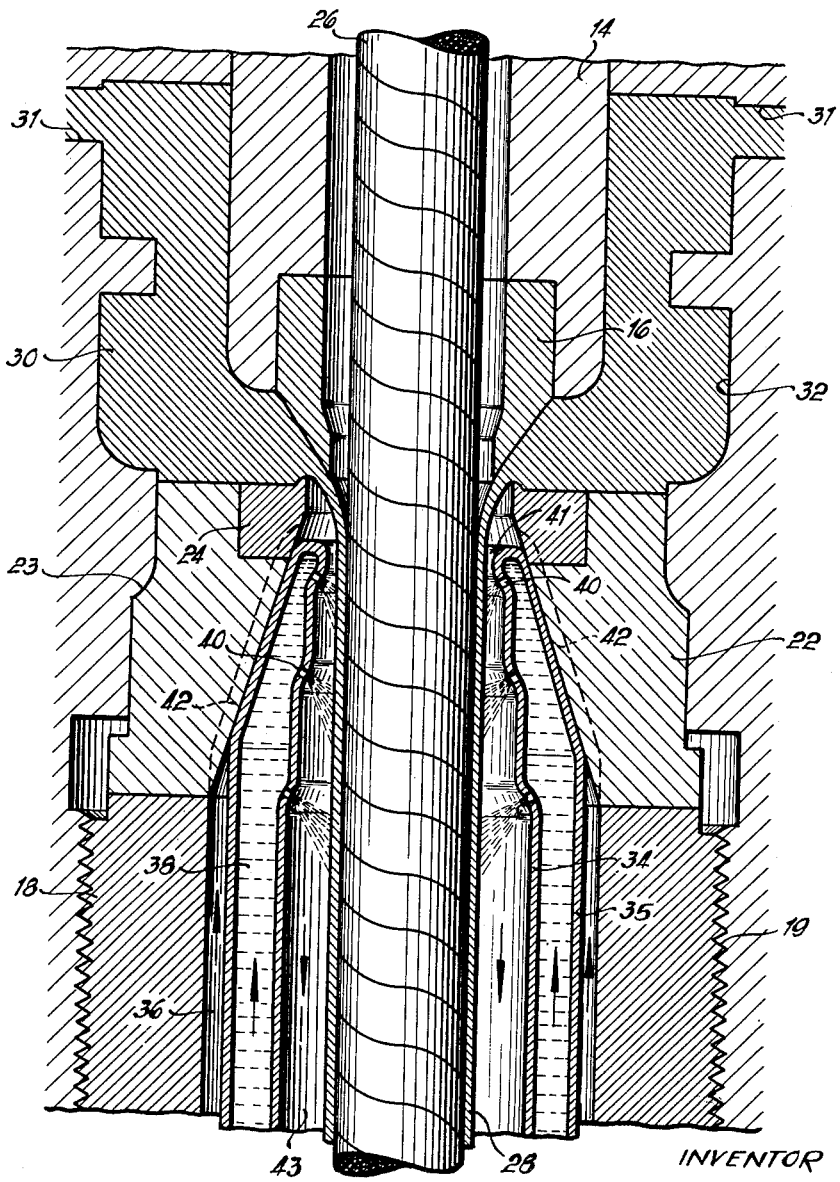

3,040,884
COOLING OF EXTRUDED PRODUCTS
Walter Haendeler, Dusseldorf, Germany, assignor to Schloemann Aktiengesellschaft, Dusseldorf, Germany
Filed May 13, 1959, Ser. No. 812,894
Claims priority, application Germany May 20, 1958
4 Claims. (Cl. 207—16)

When extruding a sheath on to an insulated electric cable, for example, in order to obviate injury to the cable insulation resulting from the action of the heat of the sheath, particularly in the case of an aluminum sheath, that is being applied to the cable core, the cable sheath is cooled by spraying water on to it. On the other hand, a cooling down of the die, and of the material in the extrusion chamber, must be avoided, in order, by a uniform flow of the metal, to obtain a cable sheath with a smooth and satisfactory surface.

The object of the invention is to provide a method of cooling which will prevent a back-wash of the cooling water sprayed on to the cable sheath, and will thus obviate any cooling of the die and of the extrusion material by the cooling water.

According to the invention a current of air, in the direction of the issuing material, is directed on to the water that is being sprayed on to the cable sheath. Any back-wash of the water is thereby prevented, and the die and the extrusion material are protected from an undesirable cooling.

For carrying out the method according to the invention the cable sheath is surrounded with a double tube, known in itself, conveying the cooling water, which sprays the water on to the cable sheath obliquely in jet form in the direction of the issuing extruded product, and a path is provided for the access of air, which allows atmospheric air to pass between the tip of the double tube and the die.

The jets of water spraying obliquely on to the cable sheath drag air along with them, and therefore produce a current of air in the direction of the issuing cable. This air current, which of course can only occur when a path of access is provided for the air, draws along with it, in the direction of motion of the cable, that part of the sprayed water that tends, owing to back-wash, to flow in the direction opposite to that of the cable, and in this way the water is kept away from the die. In particular, for this purpose, a larger number of spraying nozzles is provided and a larger quantity of water is sprayed than is necessary for the cooling of the cable sheath itself. The greater quantity of water sprayed is intended to serve merely for increasing the flow of air that opposes a reflux of water towards the die. It is however also possible to admit the current of air directly from the exterior under pressure.

It is further proposed to preheat the external air, up to 100° or 200° C. for example. The double tube is preferably caused to bear with a conically tapering tip against the correspondingly shaped die and die-holder, and ducts for the supply of air are provided either in the external surface of the double tube or in the die and the die-holder. In most cases it is sufficient if the aggregate breadth of all the ducts amounts to about from ¼ to ¹⁄₁₀ of the periphery of the tube, but it may be even greater.

One constructional example of the invention is illustrated in the accompanying drawings, in which:
FIGURE 1 shows in horizontal section the main members of a hydraulic press; while
FIGURE 2 shows on a larger scale a longitudinal section through the cooling means of the press head.

The actual press head 2 of the press is stationarily supported, in a manner known in itself, upon a machine foundation. From each side a container 4 is pressed, likewise in a known manner, by means not shown, against the press head 2. Each container 4 has a sleeve 6, which is intended for the reception of the heated metal billet, of aluminum for example. In each sleeve there is a press disc 8, which can be forced towards the press head 2 by a press ram 10. The ram 10 is actuated in a manner known in itself, preferably by hydraulic means, namely by a stationary cylinder, in which there moves a piston, which actuates the ram 10. The press head 2 has in its longitudinal direction a bore, which is differentially constructed. It accommodates at one end a screw member 12, which screws into the press head 2 by means of a thread 13, and presses an annular flange of the mandrel-holder 14 against a shoulder 15. The mandrel-holder 14 carries a mandrel 16. From the other end a screw member 18 screws into the press head 2 by means of a thread 19. The screw member 18 presses a die-holder 22, which carries the die 24, against a shoulder 23. The mandrel 16 and the die 24 are therefore held firmly in the press head 2.

From one end a cable 26 is introduced through the mandrel holder 14 into the longitudinal bore in the head 2. It becomes sheathed with aluminum in the gap between the mandrel 16 and the die 24, so that a sheath 28 is formed. The two press discs 8 are at the same time being moved forwards, so that the extrusion material 30, which is distinguished by cross-hatching in the drawings, is forced through passages 31 in the press head 2 and through the so-called extrusion chamber 32, to form the sheath 28.

Into the screw member 18 and the die-holder 22 is inserted a tubular jacket or double tube 34, 35, which forms, with the internal wall surface of the screw member 18, an annular space 36, which is in communication with the outer air.

To the interior 38 of the tubular jacket or double tube 34, 35, that is, the annular space between the inner and outer tubular elements 34 and 35, a water inlet pipe 39 is connected. The water entering this annular space 38 is sprayed from nozzles 40 in an oblique direction on to the cable sheath 28 that has just been formed. The bulk of the water thus flows in the extrusion direction. Individual drops are however held back, and tend to be sprayed back through the narrow passage 41 towards the die 24. In order to obviate this, conduits 42 machined in the die-holder 22 and in the die 24 are connected to the annular space 36 outside the double tube. From six to ten such passages may be provided. The water sprayed out of the nozzles 40 draws along with it the air located in the annular passage 43, so that in the narrow passage 41 between the tip of the double tube 34, 35 and the cable sheath 28 there is a powerful draught of air, which prevents the spraying back of individual drops of water. The breadth of this narrow passage is less than half the distance between the inner tube 34 and the cable sheath 28 in the region of the uppermost nozzles 40. The narrower the passage 41, the greater is the draught therein, and therefore the more surely is the water kept away from the die 24. In the drawing, FIGURE 1, the space 36 is closed at the lower end. Into it opens a pipe 44, to which compressed air is supplied from a pipe 45 through an air-heater 46, in which an electrical heating coil 47 is provided.

The double tube 34, 35 is pressed into the die-holder 22 by three springs 48 distributed around the periphery, so that even when changes of temperature of the individual parts occur, it always bears firmly against the die-holder 22.

I claim:
1. A press for extruding an aluminum sheath around a cable, comprising heat sensitive material, including; a press head having an extrusion chamber in it, a hollow mandrel mounted in said head, a die mounted in said head coaxially with said mandrel so as to leave a circular extrusion gap for the extrusion of an aluminum sheath around a cable being passed through said mandrel, passage means leading from said extrusion chamber to said extrusion gap, pressing means extruding metal from said extrusion chamber through said extrusion gap, an extension on said press head on the outflow side of said die, said extension having an elongated recess in it coaxial with said die, said elongated recess having a tapering part adjacent to, and tapering towards, said die, a tubular jacket inside said elongated recess, the bore of said tubular jacket being generally coaxial with said die, and one correspondingly tapered end part of said jacket lying in said tapered part of said elongated recess, the non-tapering outer surface of said jacket being held in spaced relationship with the inner surface of said elongated recess so as to delimit a duct which is connected to a plurality of discharge ducts between the tapering part of said jacket and the adjacent inner tapering surface of said elongated recess, said discharge duct communicating with said bore, with the surface of said die, and with said duct so as to provide a passage from the latter to said die leading into said bore, a plurality of orifices in said jacket from its interior directed obliquely towards said sheath near said die in a direction away from the latter, and a liquid supply duct communicating with said interior of said jacket whereby liquid sprayed on to said sheath through said orifices can be prevented from contacting said die by gas passed through said discharge ducts.

2. A press for extruding an aluminum sheath around a cable comprising heat sensitive material, including; a press head having an extrusion chamber in it, a hollow mandrel mounted in said head, a die mounted in said head coaxial with said mandrel so as to leave a circular extrusion gap for the extrusion of an aluminum sheath around a cable being passed through said mandrel, a passage means leading from said extrusion chamber to said extrusion gap, a pressing means for extruding metal from said extrusion chamber through said extrusion gap, an extension on said press head on the outflow side of said die, said extension having an elongated recess in it coaxial with said die, said elongated recess having a tapering part adjacent to, and tapering towards said die, a tubular jacket inside said elongated recess, the bore of said tubular jacket being generally coaxial with said die, and one correspondingly tapered end part of said jacket lying in said tapering part of said elongated recess, the non-tapering outer surface of said jacket being held in spaced relationship with the inner surface of said elongated recess so as to delimit a duct which is connected to a plurality of discharge ducts between the tapering part of said jacket and the adjacent inner tapering surface of said elongated recess, said discharge ducts communicating with said bore, with the surface of said die, and with said duct so as to provide a passage from the latter to said die leading into said bore, a plurality of orifices in said jacket from its interior directed obliquely towards the axis of said jacket in a direction away from said die, a pipe directed into said duct of annular cross section from its end furthest from said die for blowing cooling gas into it, and a liquid supply duct communicating with said interior of said jacket, whereby liquid sprayed on to said sheath can be prevented from contacting said die by gas passed through said discharge ducts.

3. A press for extruding an aluminum sheath around a cable comprising heat sensitive insulating material, including; a press head having an extrusion chamber in it, a hollow mandrel fixedly mounted in said head, a die mounted fixedly in said head coaxial with said mandrel so as to leave a circular extrusion gap for the extrusion of an aluminum sheath around a cable being passed through said mandrel, passage means leading from said extrusion chamber to said extrusion gap, a pressing means for extruding metal from said extrusion chamber through said extrusion gap, an extension on said press head on the outflow side of said die, an externally screw threaded member held in a boring in said extension, said threaded die, said elongated recess having a tapering part adjacent to, and tapering towards, said die, a tubular jacket inside said elongated recess, the bore of said tubular jacket being generally coaxial with said die, and one correspondingly tapered end part of said jacket lying in said tapering part of said elongated recess, the non-tapering outer surface of said jacket being held in spaced relationship with the inner surface of said elongated recess so as to delimit a duct of annular cross section which is connected to a plurality of discharge ducts between the tapering part of said jacket and the adjacent inner tapering surface of said elongated recess, said discharge ducts communicating with said bore, with the surface of said die, and with said duct of annular cross section so as to provide a passage from the latter to said die leading into said bore, a plurality of orifices in said jacket from its interior directed obliquely towards the axis of said jacket in a direction away from said die, and a liquid supply duct communicating with said interior of said jacket, whereby liquid sprayed on to said sheath can be prevented from contacting said die by gas blown through said discharge ducts.

4. A press for extruding an aluminum sheath around a cable comprising heat sensitive material, including; a press head, an extrusion chamber in said head, a hollow mandrel fixedly mounted in said head, a die mounted fixedly in said head coaxially with said mandrel so as to leave a circular extrusion gap for extrusion of aluminum sheath around a cable being passed through said mandrel, a passage leading from said extrusion chamber to said extrusion gap, a pressing means for extruding metal from said extrusion chamber through said extrusion gap, an extension on said press head on the outflow side of said die, said extrusion having an elongated recess in it coaxial with said die, said elongated recess having a tapering part adjacent to, and tapering towards, said die, a tubular jacket inside said elongated recess, the bore of said tubular jacket being generally coaxial with said die, and one correspondingly tapered end part of said jacket lying in said tapering part of said elongated recess, the non-tapering outer surface of said jacket being held in spaced relationship with the inner surface of said elongated recess so as to delimit a duct of angular cross section which is connected to a plurality of discharge ducts between the tapering part of said jacket and the adjacent inner tapering surface of said elongated recess, said discharge ducts communicating with said bore, with channels in the surface of said die, and with said duct of annular cross section so as to provide a passage from the latter to said die leading into said bore, a plurality of orifices in said jacket from its interior directed obliquely towards the axis of said jacket in a direction away from said die, and a liquid supply duct communicating with said interior of said jacket whereby liquid sprayed on to said sheath can be prevented from contacting said die by gas blown through said discharge ducts.

References Cited in the file of this patent
UNITED STATES PATENTS

| 408,377 | Cobb | Aug. 6, 1889 |
| 867,658 | Hoopes et al. | Oct. 8, 1907 |
| 1,741,815 | Boynton | Dec. 31, 1929 |
| 1,983,761 | Jacobson | Dec. 11, 1934 |
| 2,050,873 | Zickrick | Aug. 11, 1936 |
| 2,863,557 | Munker | Dec. 9, 1958 |
| 2,975,893 | Johnson | Mar. 21, 1961 |

FOREIGN PATENTS

| 657,959 | Great Britain | Oct. 3, 1951 |
| 718,077 | Great Britain | Nov. 10, 1954 |